United States Patent
Menezo et al.

(10) Patent No.: US 12,542,417 B2
(45) Date of Patent: Feb. 3, 2026

(54) PHOTONIC DEVICE FOR PROVIDING LIGHT RADIATION COMPRISING AN OPTICAL MODE IN A WAVE GUIDE

(71) Applicant: Scintil Photonics, Grenoble (FR)

(72) Inventors: Sylvie Menezo, Grenoble (FR); Torrey Thiessen, Toronto (CA)

(73) Assignee: Scintil Photonics, Grenoble (FR)

( * ) Notice: Subject to any disclaimer, the term of this patent is extended or adjusted under 35 U.S.C. 154(b) by 711 days.

(21) Appl. No.: 17/995,696

(22) PCT Filed: Mar. 8, 2021

(86) PCT No.: PCT/FR2021/050384
§ 371 (c)(1),
(2) Date: Oct. 6, 2022

(87) PCT Pub. No.: WO2021/205086
PCT Pub. Date: Oct. 14, 2021

(65) Prior Publication Data
US 2023/0132985 A1 May 4, 2023

(30) Foreign Application Priority Data
Apr. 6, 2020 (FR) ........................ 2003428

(51) Int. Cl.
| | | |
|---|---|---|
| H01S 5/042 | (2006.01) | |
| H01S 5/02 | (2006.01) | |
| H01S 5/026 | (2006.01) | |
| H01S 5/10 | (2021.01) | |
| H01S 5/125 | (2006.01) | |
| H01S 5/22 | (2006.01) | |

(52) U.S. Cl.
CPC ............ *H01S 5/0424* (2013.01); *H01S 5/021* (2013.01); *H01S 5/0268* (2013.01);
(Continued)

(58) Field of Classification Search
CPC ........... H01S 5/021; H01S 5/0424; H01S 5/22
See application file for complete search history.

(56) References Cited

U.S. PATENT DOCUMENTS

| | | |
|---|---|---|
| 8,110,823 B2 | 2/2012 | Bowers |
| 2002/0179929 A1 | 12/2002 | Takahashi et al. |
| | | (Continued) |

FOREIGN PATENT DOCUMENTS

| | | |
|---|---|---|
| CN | 102244367 A | 11/2011 |
| CN | 105723578 A | 6/2016 |
| | (Continued) | |

OTHER PUBLICATIONS

International Search Report International Application No. PCT/FR2021/050384 dated Jun. 23, 2021, 3 pages.
(Continued)

*Primary Examiner* — Michael Carter
(74) *Attorney, Agent, or Firm* — TraskBritt

(57) ABSTRACT

A photonic device for providing light radiation comprises a wave guide, an N-type semiconductor layer covering the wave guide and an active region formed by a stack of layers made of III-V materials. The photonic device also comprises a plurality of P-type semiconductor pillars arranged on and in contact with the active region. At least a first metal pad is in ohmic contact with the free portion of the N-type layer and at least a second metal pad is in ohmic contact with the P-type pillars.

20 Claims, 4 Drawing Sheets

(52) U.S. Cl.
CPC ............ *H01S 5/1064* (2013.01); *H01S 5/125* (2013.01); *H01S 5/22* (2013.01)

(56) References Cited

U.S. PATENT DOCUMENTS

| | | |
|---|---|---|
| 2018/0026111 A1 | 1/2018 | Hahn |
| 2018/0323575 A1* | 11/2018 | Caër .................... H01S 5/50 |
| 2019/0013642 A1 | 1/2019 | Stojetz et al. |

FOREIGN PATENT DOCUMENTS

| | | |
|---|---|---|
| DE | 102017113389 | 7/2021 |
| EP | 3340403 A1 | 6/2018 |
| JP | 2020-502788 A | 1/2020 |
| WO | 2018/115510 | 6/2018 |
| WO | 2019/082817 A1 | 5/2019 |

OTHER PUBLICATIONS

International Written Opinion International Application No. PCT/FR2021/050384 dated Jun. 23, 2021, 5 pages.

Seifried et al., Monolithically Integrated CMOS-Compatible III-V on Silicon Lasers, IEEE Journal of Selected Topics in Quantum Electronics, vol. 24, No. 6, Nov./Dec. 2018, 9 pages.

Japanese Official Notice of Rejection for Application No. 2023-503516 dated Jul. 23, 2024, 4 pages with English translation.

Chinese Office Action for Application No. 202180024731.8 dated Nov. 29, 2024, 11 pages with translation.

* cited by examiner

PHOTONIC DEVICE FOR PROVIDING LIGHT RADIATION COMPRISING AN OPTICAL MODE IN A WAVE GUIDE

CROSS-REFERENCE TO RELATED APPLICATIONS

This application is a national phase entry under 35 U.S.C. § 371 of International Patent Application PCT/FR2021/050384, filed Mar. 8, 2021, designating the United States of America and published as International Patent Publication WO 2021/205086 A1 on Oct. 14, 2021, which claims the benefit under Article 8 of the Patent Cooperation Treaty to French Patent Application Serial No. 2003428, filed Apr. 6, 2020.

TECHNICAL FIELD

The technical field of the present disclosure is that of integrated photonic components that use both the properties of semiconductor materials capable of emitting light and those of semiconductor materials conventionally used in integrated circuits implementing logic and/or analog functions. The present disclosure relates more particularly to a photonic device intended to establish light radiation comprising an optical mode in a wave guide. It may be, in particular, a heterogeneous laser on silicon.

BACKGROUND

An optical transceiver is generally made up of active optical devices (such as a laser, a modulator, a photodiode, etc.) and passive optical devices (such as wave guides, optical filters, etc.) optionally supplemented with electronic circuits. These blocks can be integrated into a photonic device using the technologies and materials typically used to manufacture integrated electronic circuits.

In such a photonic device, and in a manner well known per se, an active region formed by a stack of layers of III-V materials forms the optical amplification medium of a laser. This active region can comprise at least one quantum well, a quantum dot or a quantum box, or a plurality of such wells, dots or boxes. It is made from materials chosen from the following non-exhaustive list: InP, AsGa, InGaAlAs, InGaAsP, InAsP, InAs.

This active region is arranged sandwiched between an N-type semiconductor layer and a P-type semiconductor layer. These layers, typically based on InP or AsGa, make it possible to circulate a current in the active region, and to electrically pump the amplifying medium in order to allow light generation. To inject and extract electrical charges in the active region and allow this pumping, electrically conductive metal pads are respectively placed in ohmic contact with the P-type and N-type semiconductor layers. These pads are also electrically connected to electrical interconnection tracks, these tracks allowing the charges to circulate in the device.

The active region is arranged in line with a portion of a wave guide, formed from, for example, silicon, called the "hybrid portion." The optical mode generated in such an arrangement is called "hybrid," since it is partially located in the active region and in the wave guide. The wave guide extends on at least one side of the hybrid portion so as to allow the propagation of the generated mode. The paper by M. Seifried et al., "Monolithically Integrated CMOS-Compatible III-V on Silicon Lasers," in *IEEE Journal of Selected Topics in Quantum Electronics*, vol. 24, no. 6, pp. 1-9, November-December 2018, Art no. 8200709, recalls that the greater the overlap of the optical mode with the current injection zone in the active region, the greater the amplification.

To allow this laser effect, the photonic device also comprises an optical feedback structure, making it possible to form a resonant cavity for the amplifying medium. This structure can be produced by a distributed reflector, for example, a Bragg grating, arranged in the active region or, preferably, in the wave guide.

In general, light radiation is of interest, having a useful wavelength in the chosen field of application. Thus, in the telecommunications field, such a wavelength is typically between 1,200 and 1,600 nm. The various elements of the photonic device that has just been presented are configured to emit radiation in the chosen range of wavelengths.

FIG. 1 shows an embodiment of a photonic device according to the state of the art. In a thin layer DL, here resting on a support, not shown, a wave guide 2 made from silicon has been formed. The latter extends longitudinally in a plane, in a main direction X, in the coordinate system (X, Y, Z) of FIG. 1.

The wave guide has a profile (that is to say, its outline in a plane perpendicular to the main direction of propagation of the guided light) at an edge. It is therefore composed of a ribbon 2a having an extended lateral dimension (in the direction Y), and of a rib 2b whose lateral dimension is smaller, placed under the ribbon 2a and laterally centered on this ribbon 2a. The thicknesses (in the direction Z) of the ribbon 2a and of the rib 2b are each on the order of 100 nm, and typically between 50 and 500 nm. An N-type semiconductor layer In is placed on the thin layer DL, covering the wave guide 2. An electrical insulator, for example, a layer of silicon oxide, may be provided between the wave guide 2 and the N-type semiconductor layer In. This layer In has a thickness on the order of 100 nm.

On the N-type semiconductor layer In resides an active region QW on which a P-type semiconductor layer 1p rests. This assembly is arranged, in contact with the N-type layer In, in line with a hybrid portion 2h of the wave guide 2, and, in particular, in line with the rib 2b of this wave guide 2. The hybrid portion of the wave guide is structured in order to define a Bragg grating defining an optical feedback structure of the device, for example, by lateral corrugation of the guide 2 as shown in FIG. 1.

The assembly formed by the active region QW and by the P-type semiconductor layer 1p takes the form of a slab, having a lateral dimension smaller than that of the N-type semiconductor layer In, so that a free portion of this layer In, arranged on either side of the active region QW, is neither covered by the active region QW, nor covered by the P-type semiconductor layer 1p. The active region QW has a relatively small thickness on the order of 200 nm and it extends along the hybrid portion 2h of the wave guide, which may have a longitudinal distance on the order of 500 microns.

On the free portion of the N-type semiconductor layer In, a metal pad has been placed in ohmic contact with this layer, here two vias 3n, 3'n arranged on either side of the active region QW. The metal vias 3n, 3'n provide the electrical connection between the N-type semiconductor layer In and electrical interconnection tracks IC that overhang the assembly. Similarly, a metal pad 3p in the form of another via is in ohmic contact with the P-type semiconductor layer 1p in order to ensure the electrical connection between this layer and another interconnection track IC (these tracks are not shown in the top view of FIG. 1 to preserve the readability of this view).

The optical mode M generated by the photonic device when a current is injected into the active region QW via the P-type semiconductor layer 1p is shown in dotted lines on the section of FIG. 1. It is observed that this mode has a very large extent in a direction perpendicular to the plane (X, Y) in which the wave guide is defined. To prevent this mode from intercepting the metal elements of the device, in particular, the second metal pad 3p, the thickness of the P-type layer 1p is particularly great, greater than one micron and up to several microns. In this way, the metal pads 3n, 3'n, 3p are sufficiently spaced apart from the active region QW and the absorption of light radiation in the metal constituting the pads is thus avoided.

However, this configuration is not advantageous. It first requires a significant thickness of material forming the P-type semiconductor layer 1p, which is not favorable during the manufacture of the photonic device. Indeed, the etching of this significant thickness is long and also generates a high surface topology, which is troublesome for the rest of the manufacturing operations, in particular, for the formation of the metal pads. Furthermore, the P-type semiconductor layer 1p, typically formed from InP, for example, doped with zinc at approximately $2^E18$ at/cm$^3$, has a particularly high absorption factor (in particular, in the range of useful wavelengths in the field of optical telecommunications), on the order of −40 to 70 dB/cm. This factor should be compared to that of an N-type semiconductor layer, based on InP N, for example, doped with sulfur at $2^E18$/cm$^3$, on the order of 15 dB/cm, and compared to that of silicon, on the order of −2 dB/cm.

Thus, the architecture of the photonic device shown in FIG. 1 is not optimal, because on the one hand the radiation produced is largely absorbed in the P-type semiconductor layer 1p, and on the other hand its manufacture is tricky when aiming to provide a flat surface.

To remedy this, this aforementioned document proposes to provide an active region QW and a P-type semiconductor layer 1p whose lateral dimensions, along the Y direction, are extended, which makes it possible to widen the optical mode generated in this direction and to flatten it in the Z direction, perpendicular to the plane in which the wave guide 2 is defined. For the injection of the current, and therefore the electrical pumping, to overlap with the optical mode, this solution requires the presence of lateral blocking layers arranged between the active region QW and the P-type semiconductor layer 1p. The current injection is therefore located in the center of the structure, because it is laterally blocked by the blocking layers. In this way, the light radiation has a mode that does not extend to the metals forming the metal pads. The drawback of this method is that it requires epitaxy to form the P-type semiconductor layer covering the lateral blocking layers. This step is carried out at very high temperature, generating stresses in the active region QW, which leads to its degradation.

The present disclosure aims to provide an alternative solution to that of the state of the art to remedy the problems posed by the presence of an imperatively thick P-type layer.

BRIEF SUMMARY

With a view to achieving one of these aims, the object of the present disclosure proposes a photonic device for providing light radiation comprising an optical mode in a wave guide, the device comprising:
  a wave guide extending in a plane along a main direction of propagation of the optical mode;
  an N-type semiconductor layer arranged to cover the wave guide;
  an active region formed from a stack of layers made of III-V materials, the active region being arranged on, and in contact with, a portion of the N-type layer in line with a portion of the wave guide, another portion of the N-type layer, called the free portion, not being in contact with the active region;
  a plurality of P-type semiconductor pillars arranged on and in contact with the active region, the P-type semiconductor material having a first optical index and the P-type pillars being separated from each other by an encapsulation material having a second optical index, lower than the first; and
  at least one first metal pad in ohmic contact with the free portion of the N-type layer and at least one second metal pad in ohmic contact with the P-type pillars.

By making the P-type layer in the form of a plurality of pillars separated laterally from each other by an encapsulation material of lower optical index, it is possible to shape the optical mode generated by the photonic device, to prevent it from extending (or to limit this extent) in the direction Z, perpendicular to the plane in which the wave guide resides, overlapping the metal pads in which it would be strongly absorbed. At the same time, it is possible to limit the thickness of the P-type pillars compared to the thickness of a P-type layer of the state of the art and without requiring a blocking layer. This increases the efficiency of the photonic device.

According to other advantageous and non-limiting features of the present disclosure, taken individually or in any technically feasible combination:
  the wave guide is configured to form an optical feedback structure;
  the optical feedback structure is a laterally corrugated or vertically corrugated Bragg grating;
  the photonic device comprises an assembly layer made from a dielectric material placed between the N-type layer and the wave guide;
  the photonic device comprises at least three P-type pillars;
  at least one of the P-type pillars is not in ohmic contact with a second metal pad;
  the encapsulation material comprises air, silicon dioxide, silicon nitride or aluminum oxide;
  the P-type pillars have different widths or are laterally separated from each other by different spacings;
  a P-type pillar is arranged in line with a laterally centered zone of the active region;
  the P-type pillars have a height of less than 1 micron;
  the active layer has a width of between 0.5 and 5 microns;
  the photonic device comprises two first metal pads arranged on either side of the active region QW; and
  the active region comprises a damaged zone arranged between two P-type pillars.

BRIEF DESCRIPTION OF THE DRAWINGS

Further features and advantages of the present disclosure will become apparent from the following detailed description of example embodiments of the present disclosure, with reference to the accompanying figures, in which.

DETAILED DESCRIPTION

For the sake of simplification of the following description, the same reference signs are used for identical elements or for elements performing the same function in the state of the art or in the different embodiments of the photonic device that are described.

Figure 1:
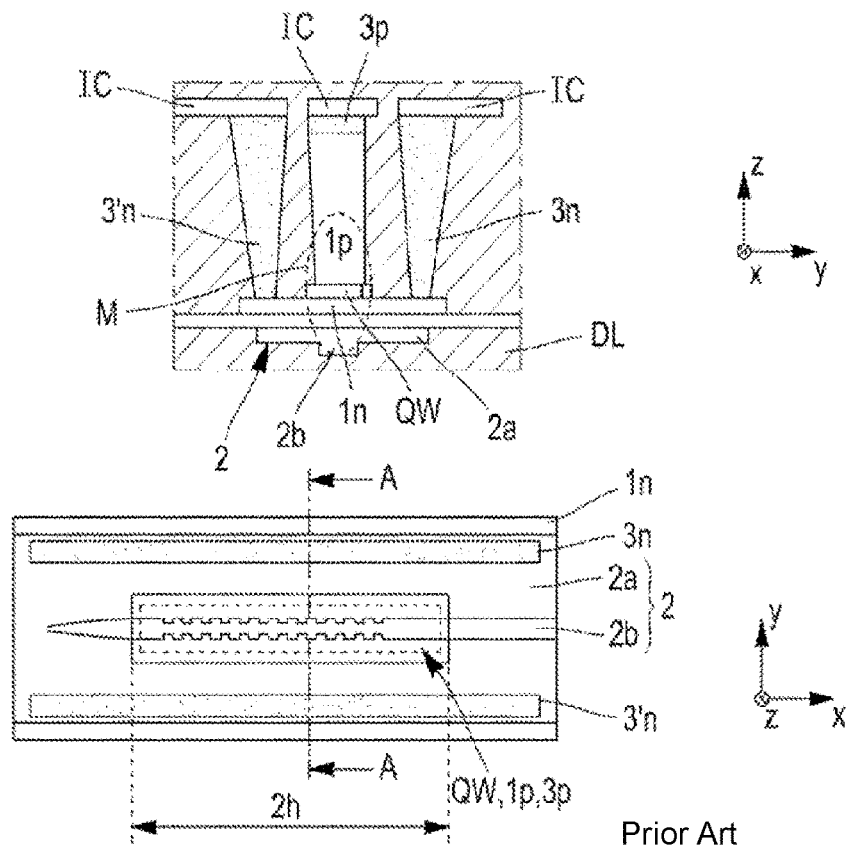
FIG. 1 shows a photonic device of the state of the art.
Figure 2:
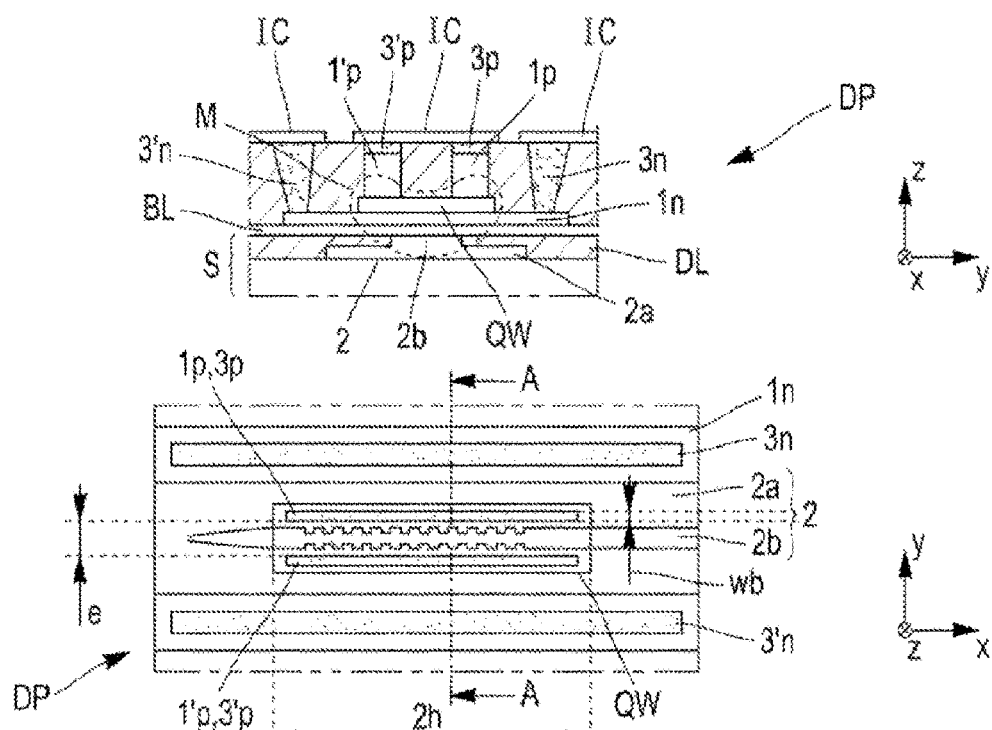
FIG. 2 shows a first embodiment of a photonic device DP according to the present disclosure.

FIG. 2 shows a first embodiment of a photonic device DP according to the present description.

In a substrate S, which may be a substrate of the silicon-on-insulator type, resides a silicon wave guide 2 arranged in a thin layer DL of this substrate S. The wave guide 2 extends longitudinally along a main direction (the direction X in FIG. 2), for example, to route the light to other components of the photonic device DP, for example, a modulator. In the example of FIG. 2, the wave guide 2 comprises a ribbon 2a. It has a maximum width (along the Y direction, transverse to the main direction) that can be between 2 and 500 microns. The wave guide shown also comprises a rib 2b, laterally centered on the ribbon 2a, and which extends from one end to the other of this ribbon 2a in the main direction. The rib 2b can have a width of between 0.05 and 20 microns. The wave guide has a thickness (along the Z direction) that can be between 5 nm and 5 microns.

In this example, the combination of the ribbon 2a and the rib 2b constitutes a wave guide 2 whose profile is an edge. It is structured in a manner that is well known per se, to form an optical feedback structure. As can be seen in the top view of FIG. 2, the wave guide 2 here is configured in the form of a Bragg grating with lateral corrugation, but the grating could have been provided with vertical corrugation, or even to integrate the optical feedback structure into the optical amplification medium of the photonic device DP.

The wave guide 2 is embedded in a dielectric material, typically silicon dioxide, the optical confinement in the guide 2 being obtained by the difference in optical index between the silicon of the wave guide 2 and the dielectric material of lower optical index than that of the silicon. The assembly comprising the dielectric and the wave guide 2 forms the thin layer DL of the substrate S.

Of course, the present disclosure is in no way limited to a wave guide 2 of the shape shown in FIG. 2, and it may have a contour different from that taken here as an example. It is also not necessary for the substrate S to be of the silicon-on-insulator type, although the use of such a substrate greatly facilitates the manufacture of the wave guide 2. It is also not necessary for the wave guide 2 to be made of silicon. By way of example, it is possible to envisage that the wave guide 2 is formed from silicon nitride deposited on a silicon substrate having a superficial oxide layer, the nitride wave guide being encapsulated by a deposited layer of silicon oxide. Thus, it is not necessary for the wave guide to be entirely encapsulated by a dielectric material, and it is possible for the thin layer DL to have a surface topology leading to the formation of cavities in the structure when the photonic device DP is supplemented, as is, for example, the case in U.S. Patent Application Publication U.S. Pat. No. 8,110,823.

Continuing the description of the embodiment of FIG. 2, the wave guide 2 is topped by an emitting structure comprising an active region QW sandwiched between layers of N-type semiconductor material In and P-type semiconductor material 1p.

More specifically, the photonic device of FIG. 2 comprises an N-type semiconductor layer In arranged to overlap the wave guide 2, that is to say, extending laterally on either side of this guide over at least part of its length. It has a width typically between 20 and 200 microns (in the Y direction). The N-type semiconductor layer can be formed from InP doped with sulfur and it can have a thickness generally between 50 and 500 nm, when the wave guide 2 is made from silicon. The N-type semiconductor layer In can be in direct contact with the wave guide 2, more generally with the thin layer DL, or one can provide, as is the case in FIG. 2, an assembly layer BL between the thin layer DL and the N-type semiconductor layer In. This assembly layer is preferably thin, with a thickness between a few nanometers and 150 nm.

For the sake of brevity, in the remainder of this description, the N-type semiconductor layer will be designated by the expression "N-type layer," it being understood that this layer comprises a semiconductor material.

On the N-type layer In resides an active region QW formed from a stack of III-V materials. The active region QW is arranged on and in contact with only a portion of the N-type layer In, in line with a longitudinal portion 2h of the wave guide 2, called the hybrid portion. A so-called "free" portion of the N-type layer In is therefore not in contact with the active layer QW, and this free portion, here arranged laterally on either side of the active region QW, can be used to form ohmic contacts.

The active region QW has a thickness generally between 10 and 500 nm, typically on the order of 50 nm, and it extends along the hybrid portion 2h of the wave guide 2 over a length typically between 100 and 2,000 microns. It has a width that may be between 0.5 and 30 microns, for example, equal to 5 microns.

The photonic device DP according to the present description also comprises at least one first metal pad in contact with the free portion of the N-type layer In. In the example shown, two vias 3n, 3'n filled with a metallic material, for example, tungsten, are arranged on either side of the active layer QW. These metal vias ensure the electrical connection between the N-type layer In and interconnection tracks IC of the photonic device DP (not shown in the top view of FIG. 2 to preserve the readability of this view).

Finally, the photonic device DP of FIG. 2 comprises a plurality of pillars made of P-type semiconductor material 1p arranged on, and in contact with, the active region QW. These pillars will be designated by the expression "P-type pillars" in the remainder of this description, it being understood that they are made in all cases from a semiconductor material. Thus, this figure shows a first P-type pillar 1p made from P-doped InP arranged along a first side of the active region QW and a second P-type pillar 1'p arranged along the other side of this region. The lower faces of these pillars 1p, 1'p are in contact with the active region QW and the upper faces are respectively in ohmic contact with second metal pads 3p, 3'p. The P-type pillars 1p, 1'p are separated from each other by an encapsulation material having an optical index lower than that of the semiconductor material from which the pillars are formed. It may thus be a dielectric material based on silicon oxide, silicon nitride, a polymer dielectric based on benzocyclobutene, or even air. In all cases, the semiconductor material from which the P-type pillars are formed has a first optical index, and the encapsulation material separating the P-type pillars has a second index, lower than the first.

Such an arrangement in P-type pillars makes it possible to shape the optical mode generated by the photonic device, to prevent it from extending (or to limit this extent) along the Z direction, perpendicular to the plane in which the wave guide 2 resides.

The P-type pillars 1p and 1'p extend over the entire length of the active region QW, or at least over a major part of this length. The width of each pillar Wb and the spacing e between each pillar 1p, 1'p of course depend on the width of the active layer QW and on the number of pillars. The width of a pillar or the spacing between two pillars need not all be the same. By way of example, and depending on the width of the active region QW on which it rests, a pillar may have a width Wb of between 0.5 and 3 microns and the spacing e between two pillars may be between 0.1 and 2 microns.

As already mentioned, the N-type layer In, the active region QW and the P-type pillars 1p are embedded in an encapsulation material, typically a silicon oxide. The first and second metal pads are arranged in this material, to electrically connect the various elements to the electrical interconnection tracks IC arranged on the encapsulation material and that overhang the assembly.

The optical mode M generated in a hybrid manner in the active layer QW and in the wave guide 2 by the photonic device DP shown in FIG. 2 is shown in dotted lines on the cross-section of this figure. The plurality of P-type pillars 1p, 1'p makes it possible to shape this optical mode M, so that it extends laterally in a privileged way, in the Y direction of FIG. 2, and to prevent it from extending in the Z direction, perpendicular to the plane in which the active region QW resides. This reduces the risk of this optical mode covering the metal zones, and in particular, the metal pads 3p, 3'p in ohmic contact with the P-type pillars 1p, 1'p.

In general, the number of P-type pillars, the width Wb of these pillars and the spacing e between two P-type pillars are adapted to the width of the wave guide 2. They are chosen to craft the shape of the hybrid optical mode so that it preferentially extends laterally.

Thus, it is possible to reduce the height of these pillars 1p, 1'p in comparison with the thickness of 1 or 2 microns or more encountered in the devices of the state of the art. This feature is particularly advantageous, because the P-type semiconductor material forming these pillars has a particularly high optical absorption factor. Since the structure is free of any blocking layer, the formation of these pillars is easy to implement, it does not require an epitaxy recovery step, and it is easy to provide a photonic device having a flat surface. As will be made apparent in the results presented in the next section of this description, it is possible to form P-type pillars 1p, 1'p that have a height of less than 1 micron, or even 500 nm, or 300 nm while limiting the absorption losses in the metal pads below 0.1 dB.

Figure 3A:
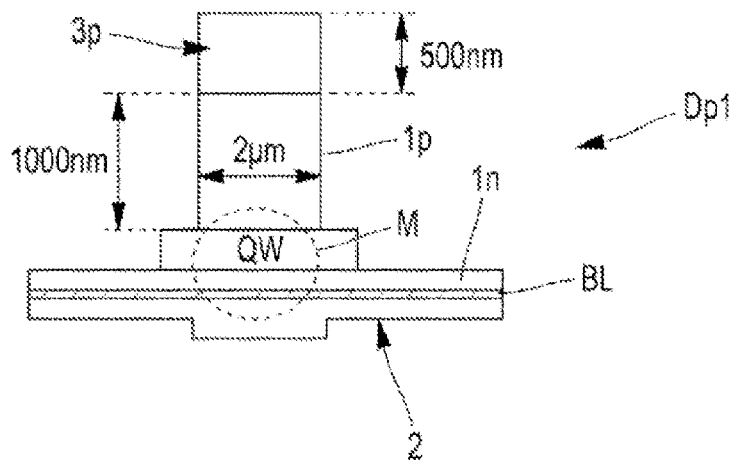
FIGS. 3A-3C show three simulated architectures of photonic devices making apparent the advantages of a photonic device according to the present disclosure.
Figure 3B:
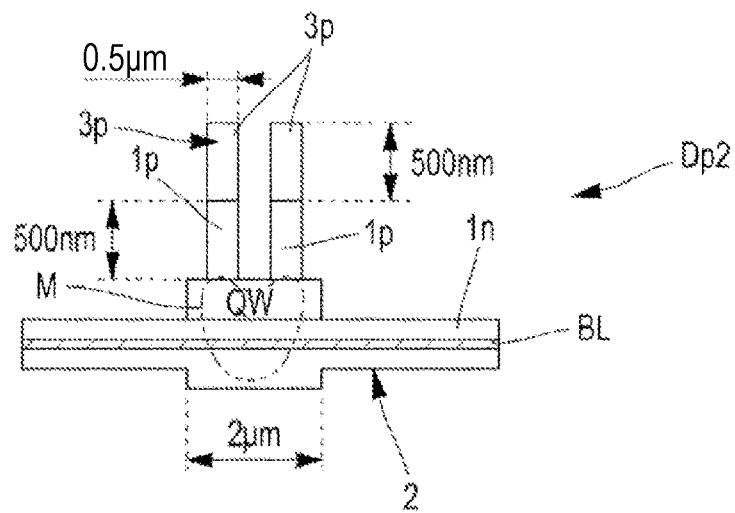
Figure 3C:
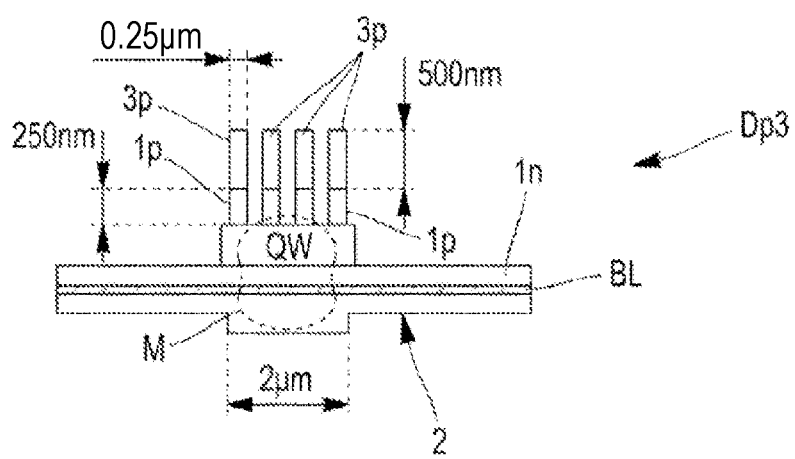

To show the full benefit obtained by replacing the continuous P-type layer of the state of the art with a plurality of P-type pillars 1p, 1'p, separated by an encapsulation material of lower index, several structures DP1, DP2, DP3 were simulated whose architectures are shown in FIGS. 3A-3C.

The first structure DP1 of FIG. 3A corresponds to a state-of-the-art photonic device formed based on InP. The active layer QW extends over a width of 3 microns. The continuous layer of P-type InP 1p, centered on the active layer and in line with the rib of the wave guide 2, has a width of 2 microns. This layer, 1 micron thick, is topped by a 500 nm metal pad 3p. An assembly layer BL is placed between the N-type layer In and the wave guide 2.

The second structure DP2 of FIG. 3B is according to the present disclosure. The active region QW is 2 microns wide and overhangs the rib of the wave guide 2. In this second structure DP2, two P-type pillars 1p made from P-doped InP with a width Wb of 0.5 microns each, and spaced apart by a distance e' of 0.5 microns, have also been provided. The P-type pillars are each arranged 0.25 microns from the edge of the active layer QW. The two P-type pillars 1p of this second structure have a height of 500 nm.

The third structure DP3 of FIG. 3C is also according to the present disclosure and similar to that of the second structure DP2, but this time provided with four P-type pillars made from P-doped InP each having a width of 0.25 microns. They are spaced from each other by a distance e' of 0.25 microns. The four P-type pillars of this third structure DP3 have a height of 250 nm.

For each of these structures, the overlapping of the generated optical mode M with the various elements that compose them (wave guide 2, active region QW, P-type layer or pillar 1p) was measured by simulation. The table below summarizes the results obtained.

TABLE 1

| Structure | P-type thickness SC | Proportion of the optical mode in the wave guide | Proportion of the optical mode in the active region | Proportion of the optical mode in P-type pillar |
|---|---|---|---|---|
| DP1 | 1,000 | 7.9% | 28% | 16.3% |
| DP2 | 500 | 24.5% | 24.3% | 5.7% |
| DP3 | 250 | 28.2% | 22.5% | 3% |

It is observed that by introducing pillars separated by the encapsulation material into the architecture of the device, it is possible to confine an increasing portion of the mode M in the wave guide 2 and in the active region QW. At the same time, the covering of this radiation with the P-type semiconductor material forming the continuous layer of the first structure DP1 or the P-type pillars of the second and third structures DP2, DP3 is limited. It is recalled that P-doped InP has an absorption factor of light radiation on the order of 50 dB/cm, that the active region QW, when formed from InN, has an absorption factor on the order of 15 dB/cm, and that the silicon wave guide has a factor on the order of 2 dB/cm. It is therefore very advantageous to limit the covering of the radiation generated with the P-type semiconductor material, as is observed when this material is configured in the form of pillars.

Figure 4:
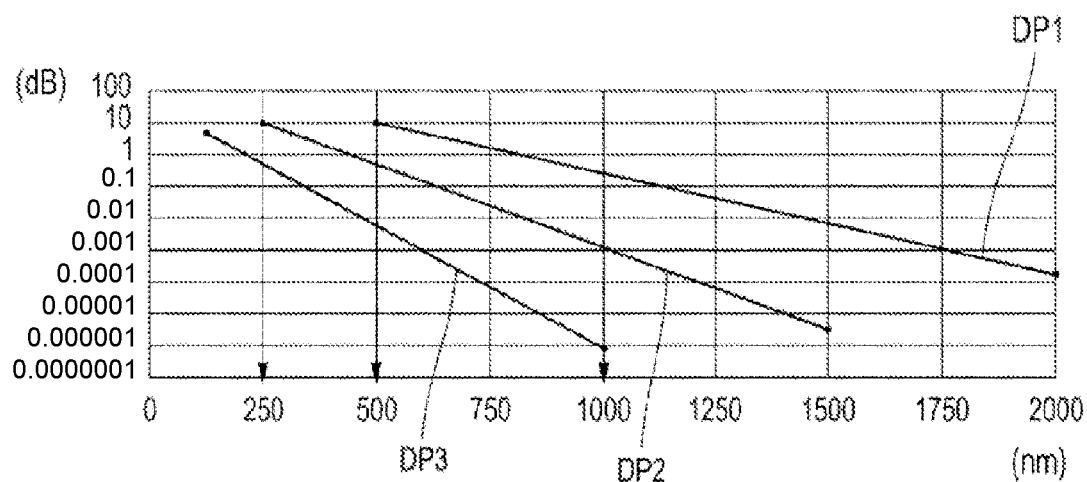
FIG. 4 shows the absorption losses in metal pads of three simulated architectures, according to the thickness of P-type semiconductor material.

In a second series of simulations, for each of the three structures DP1, DP2, DP3, the height of the P-doped InP pillars 1p was varied. The absorption losses in the metal pads 3p overhanging the P-doped semiconductor material were then estimated as a function of this thickness. The graph in FIG. 4 shows these results. The thickness, in nm, of the P-type semiconductor material forming the pillars 1p of the first structure DP1 or the P-type pillars 1p of the second and third structures DP2, DP3 has been arranged along the x-axis of this graph. The y-axis shows the absorption losses (in dB) in the metal pads 3p of these structures. It is observed on this graph that to reduce these losses below a level of 0.1 dB in a conventional structure such as the first DP1 structure, it is necessary to provide more than 1 micron of thickness for the P-type layer 1p, as was reported in the presentation of the state of the art. For the structures according to the present disclosure DP2, DP3, this thickness of semiconductor material can be reduced to less than 650 nm when two P-type pillars 1p are provided as in the second structure DP2, and it can be reduced to less than 300 nm when four P-type pillars 1p have been provided as in the case of the third structure DP3.

Figure 5:
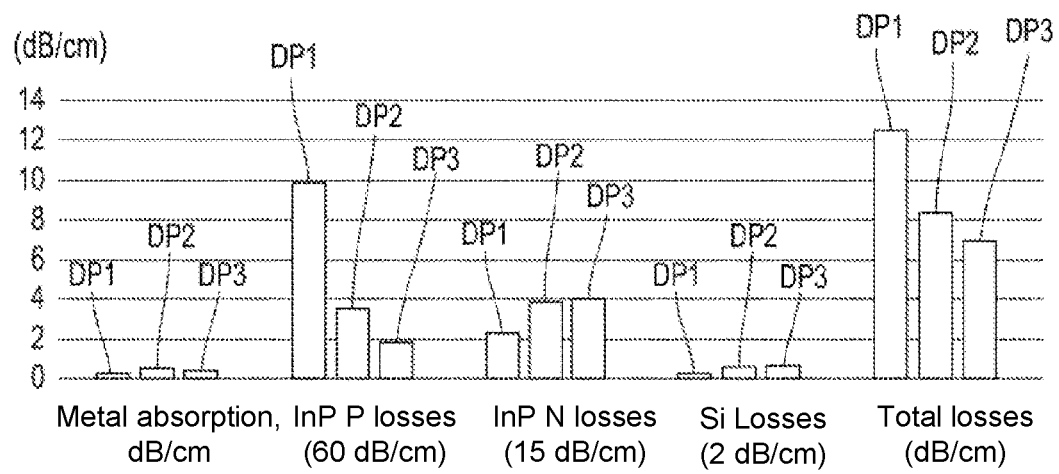
FIG. 5 shows a summary of the results of the simulations that were carried out within the framework of the preparation of the present disclosure.

Finally, FIG. 5 shows a summary of the results of the simulations that have been carried out and compares, for each of the three structures DP1, DP2, DP3 shown in FIGS. 3A-3C, the losses by absorption. As can be seen in FIG. 5, each of the structures DP1, DP2, DP3 has a sufficient thickness of P-type semiconductor material to limit the losses by absorption in the metal pads 3p, so that these losses are limited for each of these structures, well below 1 dB/cm. In the case of the first structure DP1 for which the generated optical mode extends widely in the relatively thick P-type material, the absorption losses in this material approach 10 dB/cm. This is not the case in the second and third structures DP2, DP3, where the spreading of the optical mode and the reduced thickness of P-type semiconductor material in the pillars 1p limit the absorption losses in this material to less than 5 dB/cm.

When the total losses shown in FIG. 5 are observed, the full advantage of the present disclosure is measured.

Figure 7:
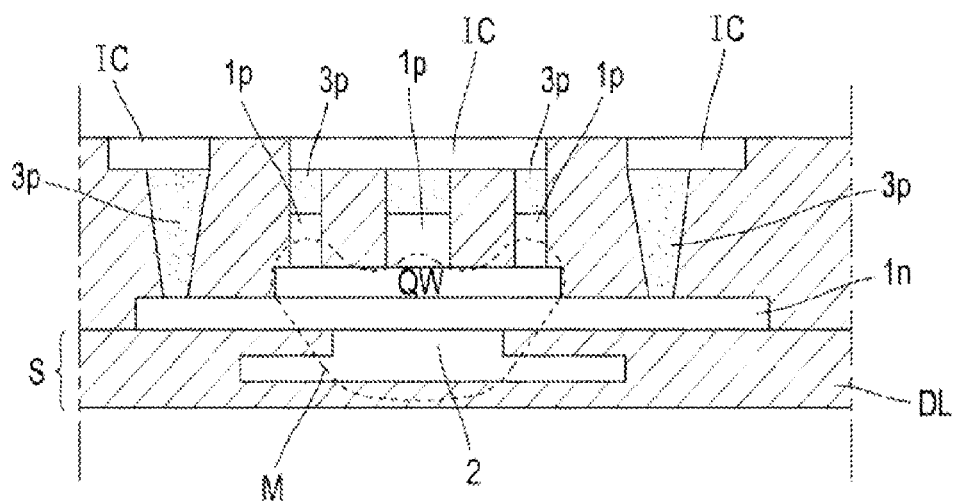

Many variations can be made to the embodiment shown in FIG. 2 without departing from the scope of the present description. Thus, and as has already been noted in connection with the presentation of the simulation results, it may be advantageous to provide more than two P-type pillars 1p, l'p. Any number of P-type pillars 1p, even or odd, for example, 3, 4, 5 or more, are provided. It may be advantageous to arrange a P-type pillar substantially centered, along the Y direction, on the active region QW. This promotes the evacuation of heat, by thermal conduction in the pillar, this heat being generated in a pronounced manner in this central zone of the active region QW. This could be achieved, for example, by choosing an odd number of P-type pillars 1p, one of the pillars then being arranged in line with this central zone. This configuration is the one shown in the example of FIG. 7, but of course other configurations are possible.

As has also already been said, the pillars can have a variable width Wb and a spacing e between them. Provision can also be made, when at least 3 P-type pillars 1p are provided, for only a plurality of these pillars 1p to be in electrical contact with at least one second metal pad, the remaining P-type pillars 1p then not being electrically connected to the interconnection tracks IC. By providing pillars that are not electrically connected made from semiconductor material embedded in the encapsulation material, it helps to confine the light mode M and to shape it so that it spreads out laterally.

Figure 6:
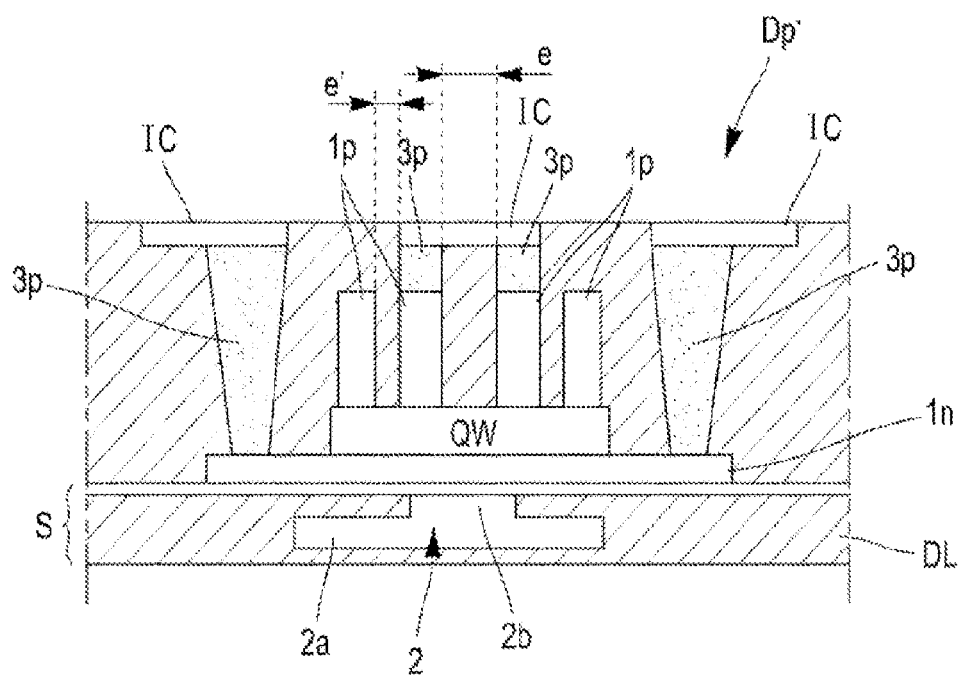
FIGS. 6 and 7 show other embodiments of a photonic device according to the present disclosure.

FIG. 6 thus shows a sectional view of a photonic device DP' having 4 P-type pillars 1p. The external P-type pillars are not connected to a second metal pad 3p and therefore to the interconnection tracks IC. The distance e' separating the central P-type pillars is greater than the distance e' separating an outer pillar from a central pillar.

In general, usual simulation means can be used to determine the geometric parameters of the plurality of P-type pillars, their number and their relative locations to give the optical mode a suitable shape.

It is also possible to provide for the wave guide 2 to be turned over with respect to its arrangement of FIG. 2, as is the case with the photonic device DP' shown in FIG. 6. In such a configuration, the ribbon 2a is placed between the N-type layer In and the rib 2b. The assembly layer BL of the photonic device DP' of FIG. 6 is optional.

To help in the confinement of the optical mode and to shape it so that it extends mainly laterally, provision can be made to damage part of the active region QW, in particular, in a portion of this region QW that is not overhung by a P-type pillar 1p, so as to make it optically inert. This damage to the crystalline structure of the active region QW can be achieved by implanting heavy species, such as silicon.

The method for manufacturing a photonic device DP, DP' according to the various embodiments that have just been presented is very similar to a method of the state of the art.

The wave guide 2 is first formed in a substrate, in an entirely conventional manner, by etching, deposition, oxidation, etc. This step can comprise transferring the wave guide 2 from a starting substrate to the substrate S that will then be used to form the photonic device. Alternatively, the wave guide 2 can be formed directly in this substrate S.

A label covering the wave guide 2 is transferred onto the substrate S in which this wave guide 2 resides, the label comprising a stack formed by an N-type semiconductor layer, an active layer, and a P-type semiconductor layer. This label is intended to form the emitting structure of the photonic device. The P-type semiconductor layer therefore has a thickness substantially equal to that of the P-type pillars of the targeted photonic device, for example, less than 1 micron, or less than 500 nm. In general, the label has a small thickness, less than two microns.

The label forms a slab of these stacked layers, and it is placed on the substrate S overlapping the wave guide 2, the N-type semiconductor layer being placed on the side of the wave guide 2. Provision can be made for an assembly layer BL to be placed between this wave guide 2 and the N-type semiconductor layer.

In subsequent localized etching steps, this label is processed to precisely define the emitting structure. For this reason, a portion of the P-type semiconductor layer is removed to form the P-type pillars 1p and to expose the active layer. The side portions of this layer are eliminated to define the active region QW and to expose at least one free portion of the N-type semiconductor layer. This free portion can also be partially eliminated to form the N-type layer in its final dimensions.

The assembly is then encapsulated by depositing the encapsulation material, which can then be rendered flat, for example, using a mechanical-chemical polishing step. It is noted that since the label initially has a relatively small thickness, the localized etching steps are quick to execute, the surface topology after these steps is less, the thickness of encapsulation material necessary to cover the emitting structure is reduced, and the polishing step aimed at making the final surface flat is facilitated.

In complementary steps of the method for manufacturing the photonic device, recesses are produced by etching in the encapsulation material that are filled with a metallic material in order to produce the first and second metal pads in ohmic contact with the free portion of the N-type layer In and with at least some of the P-type pillars 1p.

Naturally, the present disclosure is not limited to the embodiments described, and it is possible to add variant embodiments without departing from the scope of the invention as defined by the claims.

Thus, although P-type semiconductor pillars have been presented here that are entirely separated from each other by an encapsulation material having a lower optical index, it is not necessary that this always be the case. Provision can thus be made for at least some of the P-type pillars to be secured to the pillars that are contiguous to them at their feet, over only part of their height. In all cases, the layer of P-type semiconductor material of the label is structured on the wave guide to craft the shape of the optical mode generated so that it extends in a privileged manner in the transverse direction, as has been presented in detail in the present description.

The invention claimed is:

1. A photonic device for providing light radiation comprising an optical mode in a wave guide, the device comprising:
- a wave guide extending in a plane along a main direction of propagation of the optical mode;
- an N-type semiconductor layer covering the wave guide;
- an active region comprising a stack of layers of III-V materials, the active region disposed on, and in contact with, a portion of the N-type semiconductor layer in line with a portion of the wave guide, another free portion of the N-type semiconductor layer not contacting the active region;
- a plurality of P-type semiconductor pillars on and in contact with the active region, the P-type semiconductor pillars comprising P-type semiconductor material having a first optical index, the P-type semiconductor pillars separated from each other by an encapsulation material having a second optical index, the second optical index lower than the first optical index; and
- at least one first metal pad in ohmic contact with the free portion of the N-type semiconductor layer, and at least one second metal pad in ohmic contact with the P-type semiconductor pillars.

2. The photonic device of claim 1, wherein the wave guide is configured to form an optical feedback structure.

3. The photonic device of claim 2, wherein the optical feedback structure is a laterally corrugated or vertically corrugated Bragg grating.

4. The photonic device of claim 3, further comprising an assembly layer comprising a dielectric material disposed between the N-type semiconductor layer and the wave guide.

5. The photonic device of claim 4, wherein the plurality of P-type semiconductor pillars comprises at least three P-type semiconductor pillars.

6. The photonic device of claim 5, wherein at least one of the P-type semiconductor pillars is not in ohmic contact with a second metal pad.

7. The photonic device of claim 6, wherein the encapsulation material comprises air, silicon dioxide, silicon nitride or aluminum oxide.

8. The photonic device of claim 7, wherein the P-type semiconductor pillars have different widths or are laterally separated from each other by different spacings.

9. The photonic device of claim 8, wherein a P-type semiconductor pillar of the plurality is disposed in line with a laterally centered zone of the active region.

10. The photonic device of claim 9, wherein the P-type semiconductor pillars have a height of less than 1 micron.

11. The photonic device of claim 1, wherein the active region has a width of between 0.5 and 5 microns.

12. The photonic device of claim 1, further comprising two first metal pads arranged on either side of the active region.

13. The photonic device of claim 1, wherein the active region comprises a damaged zone between two P-type semiconductor pillars of the plurality.

14. The photonic device of claim 1, further comprising an assembly layer comprising a dielectric material disposed between the N-type semiconductor layer and the wave guide.

15. The photonic device of claim 1, wherein the plurality of P-type semiconductor pillars comprises at least three P-type semiconductor pillars.

16. The photonic device of claim 15, wherein at least one of the P-type semiconductor pillars is not in ohmic contact with a second metal pad.

17. The photonic device of claim 1, wherein the encapsulation material comprises air, silicon dioxide, silicon nitride or aluminum oxide.

18. The photonic device of claim 1, wherein the P-type semiconductor pillars have different widths or are laterally separated from each other by different spacings.

19. The photonic device of claim 1, wherein a P-type semiconductor pillar of the plurality is disposed in line with a laterally centered zone of the active region.

20. The photonic device of claim 1, wherein the P-type semiconductor pillars have a height of less than 1 micron.

* * * * *